United States Patent [19]
Whitaker

[11] Patent Number: 5,233,185
[45] Date of Patent: Aug. 3, 1993

[54] LIGHT BEAM DETECTOR FOR DOOR OPENERS USING FIBER OPTICS

[75] Inventor: Louis G. Whitaker, Alliance, Ohio

[73] Assignee: GMI Holdings, Inc., Alliance, Ohio

[21] Appl. No.: 843,264

[22] Filed: Feb. 28, 1992

[51] Int. Cl.$^5$ .......................... G01V 9/04; H01J 5/16; G08B 13/18
[52] U.S. Cl. .............. 250/222.1; 250/227.21; 340/556; 49/25
[58] Field of Search .............. 250/221, 227.21, 227.22, 250/222.1; 340/555–557; 385/12; 318/468, 264, 480; 49/28, 25

[56] References Cited

U.S. PATENT DOCUMENTS

| | | | |
|---|---|---|---|
| 2,994,572 | 8/1961 | Morrison | 250/222.1 |
| 3,430,052 | 2/1969 | Stephan | 250/222.1 |
| 3,805,061 | 4/1974 | De Missimy et al. | 250/221 |
| 4,015,122 | 3/1977 | Rubinstein | 250/221 |
| 4,501,963 | 2/1985 | Perisic | 250/231.14 |
| 4,539,474 | 9/1985 | Takahata | 250/221 |
| 4,620,181 | 10/1986 | Sackett | 340/566 |
| 4,652,205 | 3/1987 | Ross et al. | 250/221 |
| 4,698,937 | 10/1987 | Kornbrekke et al. | 250/221 |
| 4,701,751 | 10/1987 | Sackett | 250/221 |
| 4,812,810 | 3/1989 | Query et al. | 340/545 |
| 4,837,430 | 6/1989 | Hasegawa | 250/221 |
| 4,922,168 | 5/1990 | Waggamon et al. | 318/286 |
| 5,033,065 | 7/1991 | Keromnes et al. | 250/221 |

*Primary Examiner*—David C. Nelms
*Assistant Examiner*—Michael Messinger
*Attorney, Agent, or Firm*—Pearne, Gordon, McCoy & Granger

[57] ABSTRACT

A light beam transmitter and receiver are located in or near a door opener enclosure, and fiber optics connect the transmitter and receiver to the sides of the door opening. Lens arrangements are attached to the ends of the optic cables and are mounted near the bottom of the door frame. Thus, the transmitter and receiver do not need to be located near the door which eliminates the need for wiring from the enclosure to the door area and protects the transmitter and detector from physical abuse at the doorway.

16 Claims, 6 Drawing Sheets

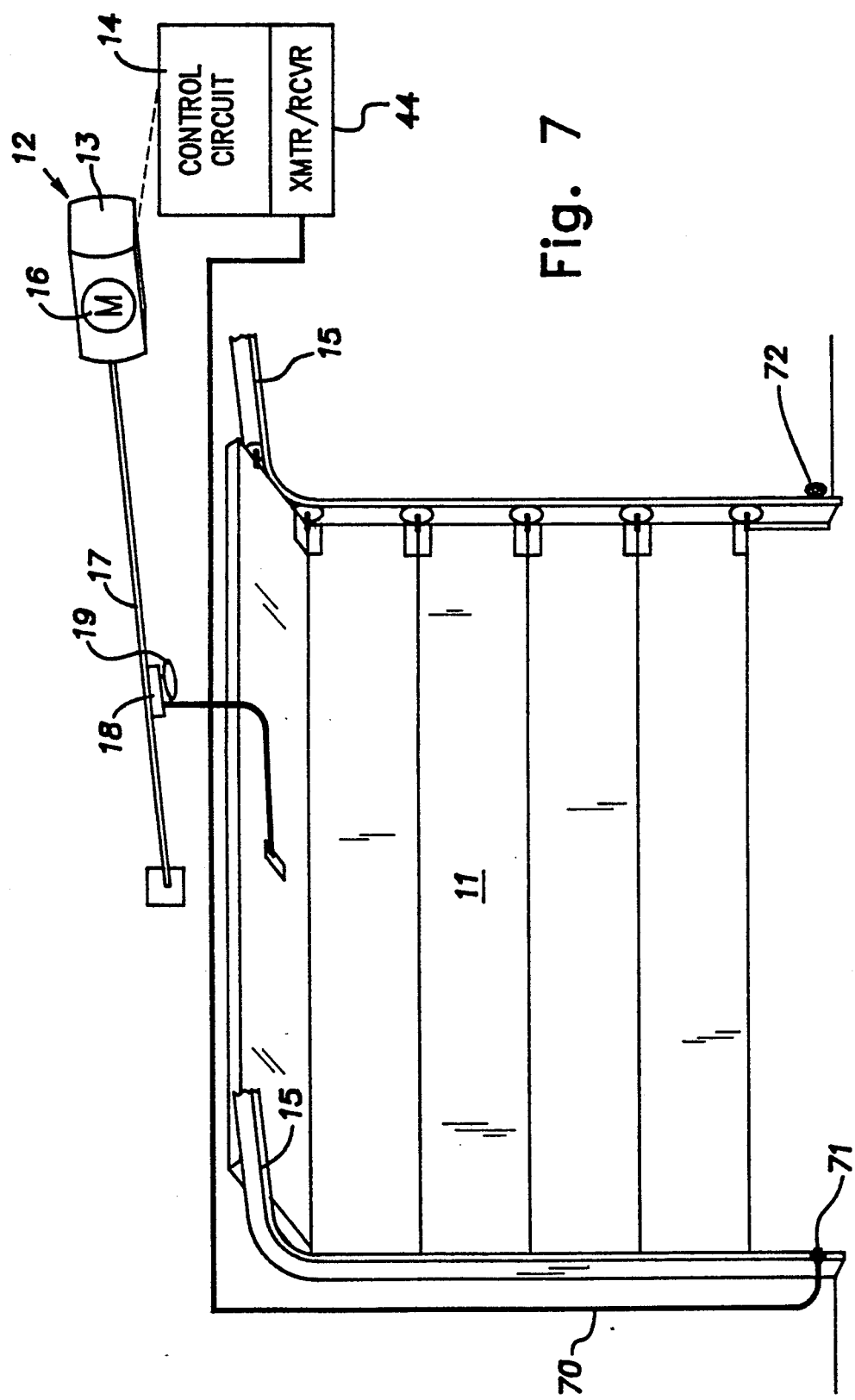

LIGHT BEAM DETECTOR FOR DOOR OPENERS USING FIBER OPTICS

BACKGROUND OF THE INVENTION

1. Field of the Invention

The invention relates generally to a safety system for garage door openers and particularly to a light beam obstruction detection system for garage door openers.

2. Description of the Prior Art

Safety systems for a garage door openers which detect the presence of an obstruction to door movement are known in the art. Typically the garage door moves on curved tracks. An electric motor opens and closes the door by means of a driving mechanism. Safety systems are intended to control door movement in response to certain sensed conditions. One such system, disclosed in U.S. Pat. No. 4,922,168, uses a light transmitter and a light receiver which are laterally opposed near the edges of the door opening. The light transmitted is generally infrared. The transmitter and receiver cooperate to detect an obstruction in the path of the transmitted signal. When the obstruction interrupts the signal from the transmitter to the receiver, the controller prevents the door from closing.

There are several problems with the prior art obstruction detectors. The transmitter and receiver are located near the ground at the door opening which exposes them to rain, snow and physical contact from people and objects passing through the door. Such physical abuse can cause the components to malfunction or degrade; thus, more frequent repair and replacement are required. The transmitter and receiver must be in electrical communication with the door operator which is generally located near the ceiling of the garage some distance from the transmitter and receiver. Multiple enclosures must be used which are costly and more difficult to install than a single enclosure. Often, the space for installing the transmitter and receiver near the door is limited making installation difficult if not impossible. Proper alignment of the relatively large enclosures can also be difficult. Costly power and signal conductors must run from the door operator to the transmitter and receiver. Worn insulation on the conductors is a potential safety hazard which can cause system failure resulting from a short circuit.

It would be preferable to have an obstruction detection device which provides simple installation, improved durability and a minimum number of pieces without compromising the reliability or effectiveness of the system.

SUMMARY OF THE INVENTION

This invention overcomes the problems of the prior art by locating the transmitter and receiver for the obstruction detector in the enclosure with the garage door controller. One end of a fiber optic cable is coupled with the transmitter and the other end has a lens arrangement which is installed near the bottom of one side of the garage door opening where the transmitter of the prior art system would have been located. The transmitter transmits a light beam through the cable and across the garage door opening to the end of a second fiber optic cable. The second cable is installed similarly to the first cable on the opposite side of the door opening and is coupled to the receiver so that the receiver receives the signal transmitted by the transmitter through the first cable, across the garage door opening and through the second cable. An object in the doorway will obstruct the beam. When the beam is interrupted the controller prevents closing of the garage door as in the prior art system.

Accordingly, an object of the present invention is to protect the transmitter and receiver from physical abuse without compromising the performance of the prior art obstruction detection system. This is accomplished by locating the transmitter and receiver in or near the door operator enclosure and providing fiber optic means for communication between the transmitter/receiver and the door opening. All garage door control components can be contained within a single enclosure to reduce the volume of space required by the garage door control system components and, in particular, to reduce the space occupied adjacent the doorway.

This invention provides simpler installation of the system components and eliminates the need for running power lines near the doorway to increase safety and reduce cost.

A fuller understanding of the invention may be had by referring to the following description and appended claims taken in conjunction with the accompanying drawings.

BRIEF DESCRIPTION OF THE DRAWINGS

FIG. 7 is a partially schematic, partially perspective view showing a single optic cable installed on one side of the door and a reflector on the opposite side.

DESCRIPTION OF THE PREFERRED EMBODIMENTS

Figure 1:
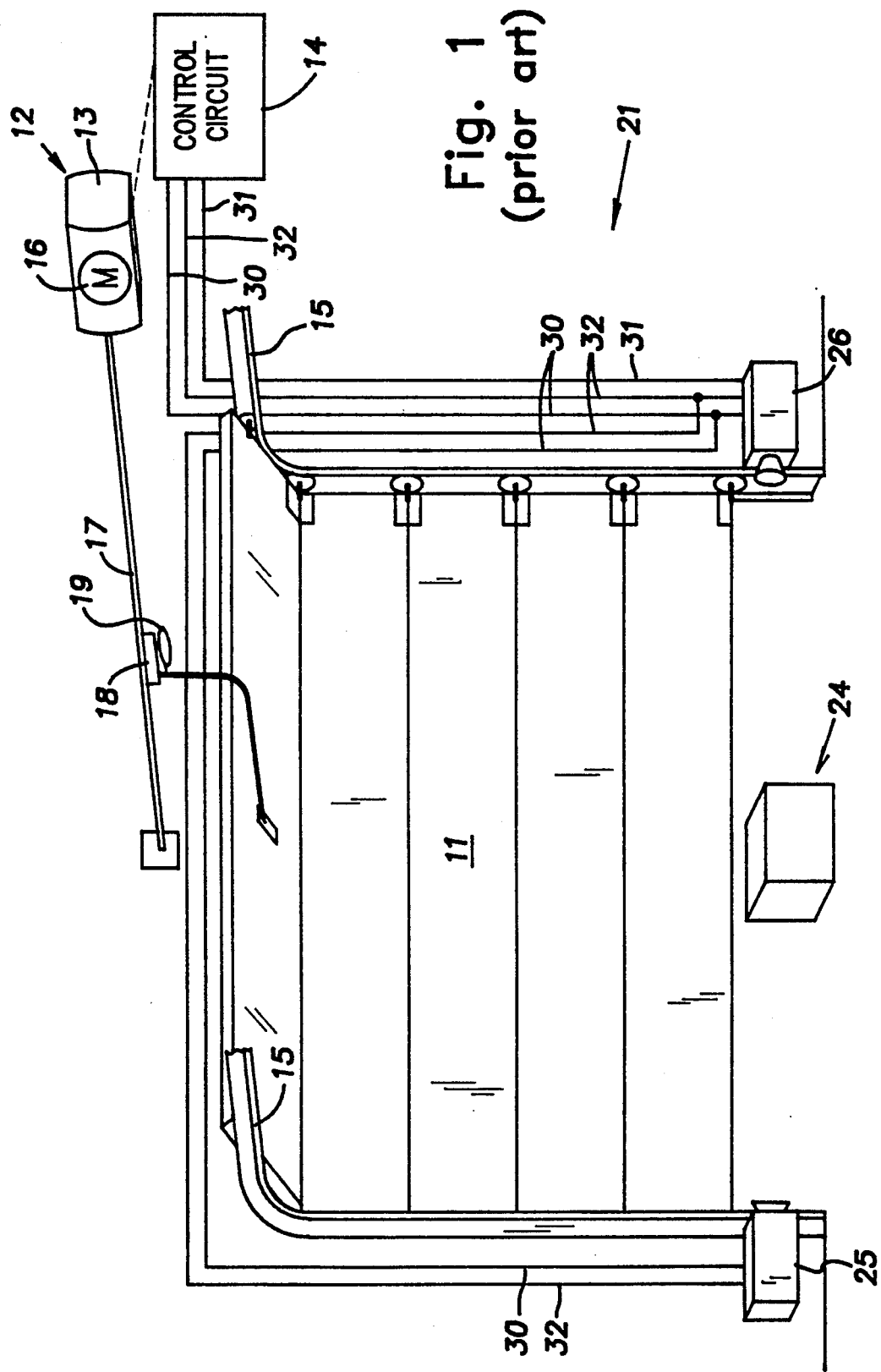
FIG. 1 is a partially schematic, partially perspective view of the prior art light beam detection system.

FIG. 1 shows a typical sectional garage door 11 and electro-mechanical opener 12. Generally, the door travels on a curved track 15. This invention can also be applied to door openers for other types of doors such as one piece garage doors. The opener has an enclosure 13, a main control circuit 14, a motor 16 and a reversible drive train 17. A driven member 18 is connectable to and releasable from the drive train by a handle 19. The control circuit 14 operates the motor 16 in response to commands from an operator. The motor moves the driven member 18 via the drive train 17. When the driven member 18 moves toward the motor 16, it pulls the door 11 up and back along the track 15 until the door is completely open; then the control circuit 14 stops the motor 16 and the door 11. When the driven member 18 moves away from the motor 16, it pushes the door forward and down along the track 15 until the door is closed; then the control circuit 14 stops the motor 16 and the door 11.

FIG. 1 shows a prior art safety control system 21 which has monitor means responsive to an obstruction 24 to door closing movement. The monitor means has a light transmitter 25 which directs a beam of light across the door opening and a light receiver 26 which detects the beam. The light beam is preferably infrared, but can be visible light or other frequencies. The control circuit 14 supplies power to the receiver and transmitter through conductors 30 and 32. The receiver 26 sends a signal to the control circuit 14 through a conductor 31 to indicate whether it is receiving the light beam from the transmitter 25. If an object 24 obstructs the beam, the receiver 26 will not receive the beam and will signal the control circuit 14 to take appropriate action.

The action taken by the control circuit 14 in response to detection of an obstruction depends on the mode of operation of the garage door at the time the obstruction is detected. If the door 11 is open, the door is prevented from closing. If the door 11 is closing, the door is stopped and reversed so that it will open. If the door 11 is opening, the door will continue to open. The control circuit 14 performs these functions by controlling the operation of the motor 16.

The operation of the garage door, opener and safety system including all components referenced above comprise the prior art an example of which is described in more detail in U.S. Pat. No. 4,922,168 which is incorporated by reference into this specification in its entirety.

Figure 2:
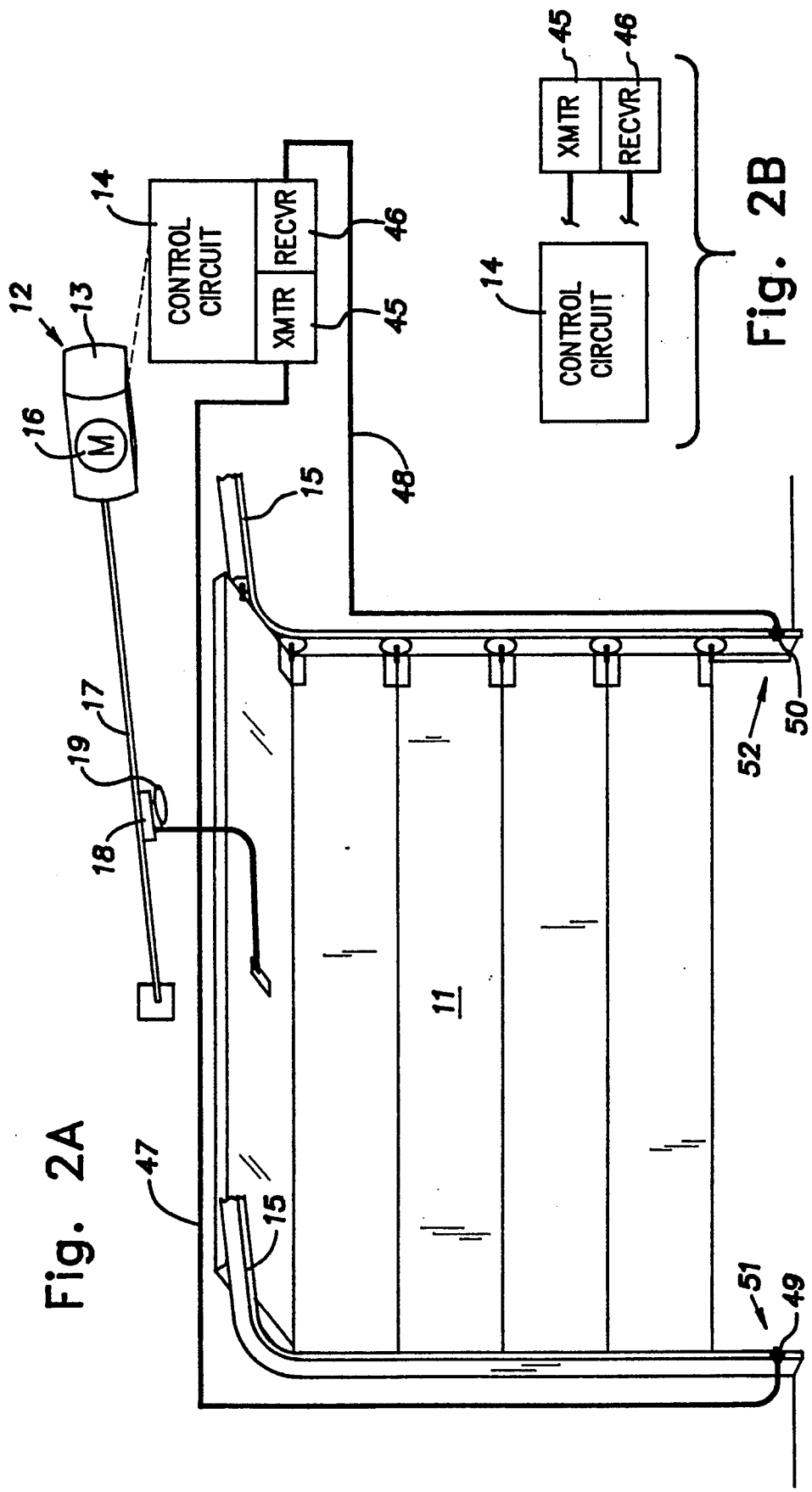
FIG. 2A is a partially schematic, partially perspective view of the invention installed on a typical garage door with the transmitter and receiver in the control circuit enclosure.
FIG. 2B is a schematic view showing the transmitter and receiver mounted separately from the control circuit enclosure.

FIG. 2A shows the components of the present invention which replace the prior art safety system. A light transmitter 45 and light receiver 46 which are substantially similar to the transmitter 25 and receiver 26 of the prior art are located in the opener enclosure 13 with the control circuit 16 which enclosure is typically mounted on the ceiling of the garage.

The transmitter 45 is connected to an optical cable 47. The distal end of the cable has a lens arrangement 49 of a type known in the art. The lens arrangement 49 is mounted near the bottom of one side of the door opening 51 so that a light beam generated by the transmitter 45 is sent through the cable 47 and the lens arrangement 49 across the door opening.

The receiver 46 is connected to an optical cable 48. The distal end of the cable has a lens arrangement 50 similar to the transmitter lens arrangement 49. The receiver lens arrangement 50 is mounted near the bottom of the garage door opening 52 on the side opposite the transmitter lens arrangement 49 so that the light beam is transmitted across the door opening through the lens arrangement 50 and optical cable 48 to the receiver 46.

Plastic optical cables 47 and 48 are preferred as they are relatively inexpensive and durable, but glass or other types are suitable.

The transmitter 45 sends a signal through the optical cable 47, through the lens arrangement 49, across the door opening, through the lens arrangement 50, through the optical cable 48, to the receiver 46. The preferred signal is infrared, but other frequencies are contemplated. Further, the signals can be pulsed or coded to prevent stray signals such as sunlight or reflections from giving erroneous indications. The receiver 46 is in communication with the control circuit 14 so that when the receiver 46 is receiving the signal, it provides an indication to the control circuit that there is no obstruction to closing of the garage door 11. This is the normal operating condition. When an obstruction 24 interrupts the signal, the signal does not reach the receiver 46. The receiver then indicates to the control circuit 14 that an obstruction is present. The control circuit 14 can prevent closing of the door 11 by preventing or stopping operation of the motor 16. If the door 11 is closing when an obstruction is detected, the motor 16 can be reversed to open the door.

As shown in FIG. 2B, the transmitter 45 and receiver 46 can be located separately from the enclosure 13, but it is preferred that they remain in close proximity to the control circuit 14.

Figure 3:
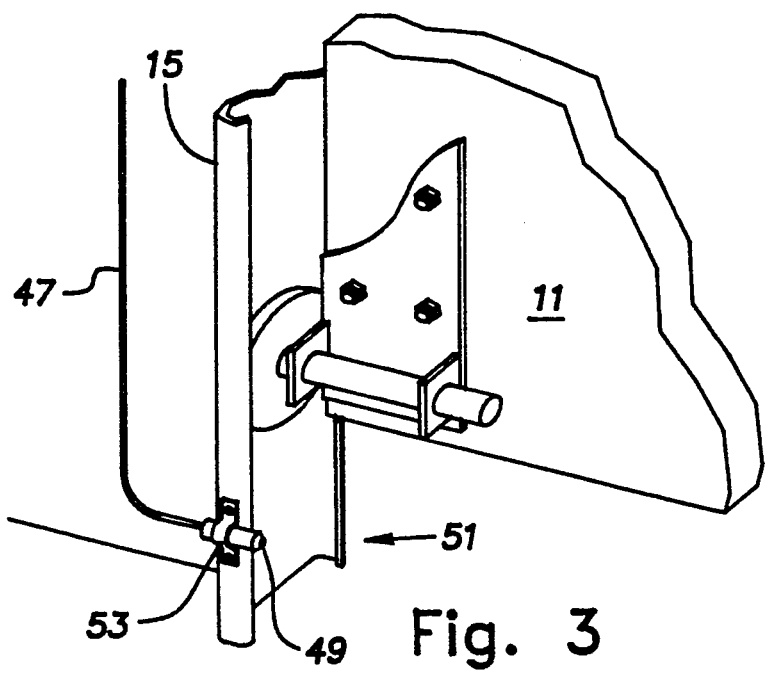
FIG. 3 is a perspective view detail showing one installation of the optic cable end.
Figure 4:
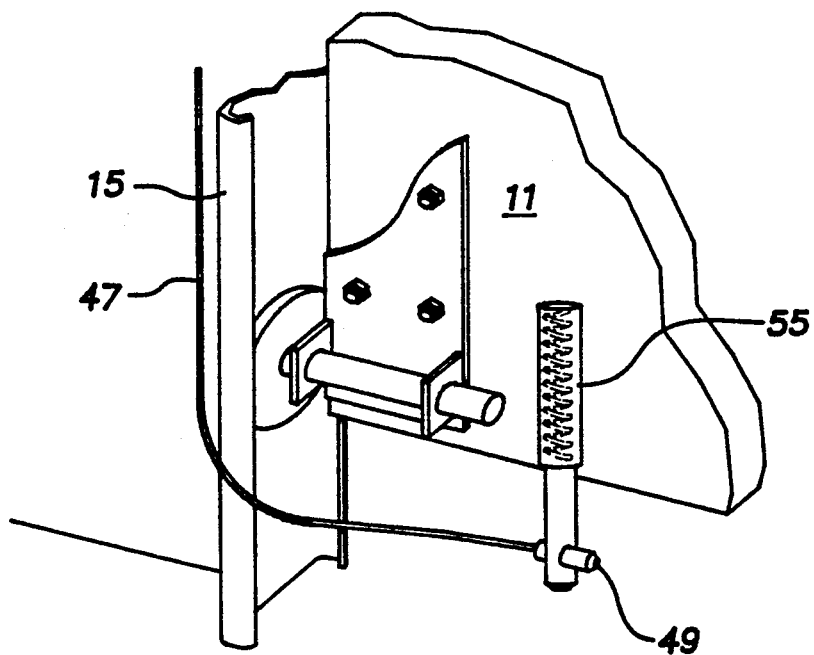
FIG. 4 is a perspective view detail showing another installation of the optic cable end.

A typical lens and cable mounting configuration employing a bracket 53 mounted on the track 15 is shown in FIG. 3, but other configurations are contemplated. The lens could be mounted on or near the door frame or, as another example, FIG. 4 shows the lens 49 mounted on a retractable spring device 55 attached to the bottom of the door 11 so that when the door is closed the lens 49 and mount 55 are forced into the retracted position by the ground or garage floor. The configuration of FIG. 4 has the advantage that the light beam is always adjacent the leading edge of the door which is where obstacles will obstruct the door. However, the FIG. 4 configuration has the disadvantage that wear on the cable will increase and an unsecured loop can be created if the cable is not retracted when the door is open. Also, the mount may be knocked out of alignment or become stuck.

Figure 5:
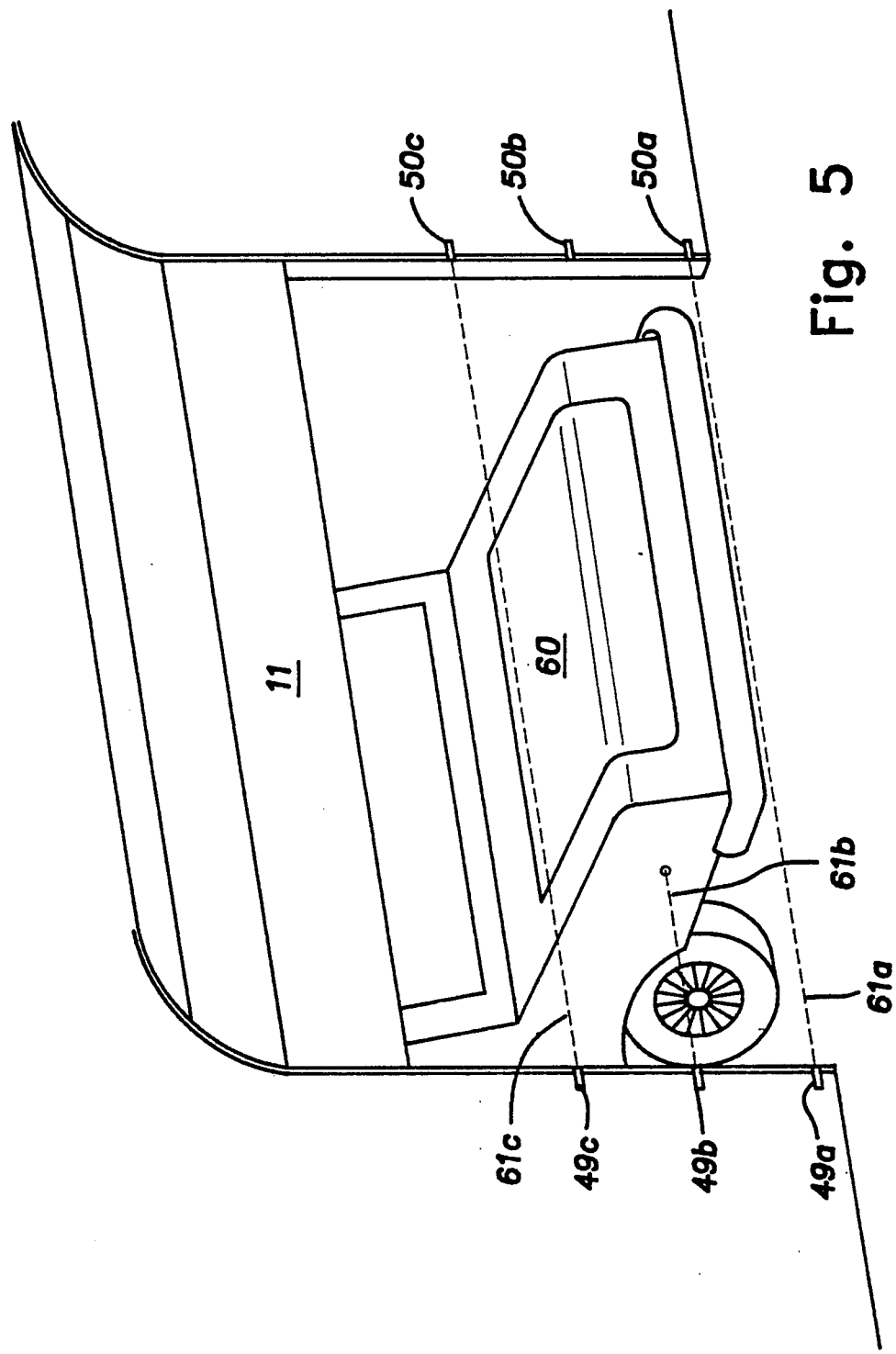
FIG. 5 is a perspective view showing several light beams and an automobile which could obstruct the door path without obstructing a light beam near ground level.

FIG. 5 shows one case where the door mounting of FIG. 4 is superior to the frame mounting of FIG. 3. The trunk 60 of a car extends into the path of the garage door 11, but because it is elevated, it does not obstruct the beam 61a near the ground. A door mounted lens, FIG. 4, would detect the trunk 60 immediately before the door 11 reached the trunk 60.

Figure 6:
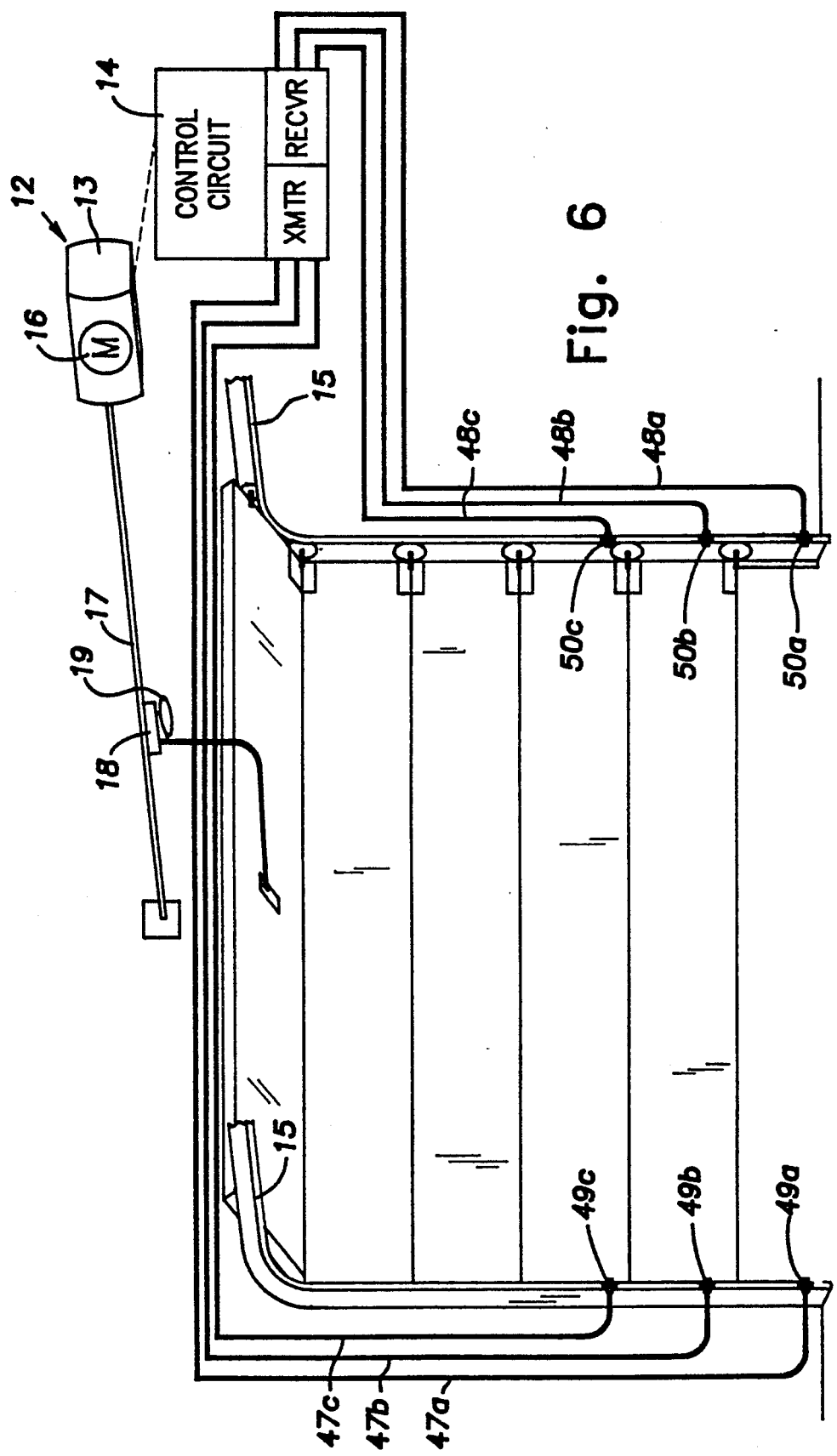
FIG. 6 is a partially schematic, partially perspective view showing optic cables installed at several levels.

Alternatively, FIG. 6 shows how several beams 61a, 61b, and 61c can be directed across the door opening at different levels by installing several transmitter lenses 49a, 49b, and 49c and cables 47a, 47b, and 47c and several receiver lenses 50a, 50b, and 50c and cables 48a, 48b, and 48c. With multiple beams, obstacles which are not near the bottom of the door opening can be detected.

FIG. 7 shows another alternative detection system in which the system uses only a single cable 70 which is connected to a combined transmitter/receiver 44. The cable has, at its end, a lens arrangement 71 of the type known in the art which is mounted as described above. Opposite the lens arrangement a reflecting device 72 is mounted so that the transmitter part of the transmitter/receiver 44 sends a signal through the cable 70 and lens arrangement 71 across the door opening to the reflector 72 which reflects the signal back across the door opening through the lens arrangement 71 and cable 70 to the receiver part transmitter/receiver 44. The cable 70 can have multiple fiber optic elements or the signal can be multiplexed and transmitted and received through a single element. Similar configurations could include separate lenses, cables, reflectors and/or transmitter/receivers. Such a system is simpler and less costly because it has fewer components. Potential drawbacks include the need to clean the reflector periodically and possible inadvertent reflections, for example, from a reflective obstruction.

The present disclosure describes several embodiments of the invention, however, the invention is not limited to these embodiments. Other variations are contemplated to be within the spirit and scope of the invention and appended claims.

What I claim is:

1. An obstruction detection safety device for a garage door which closes a garage door opening comprising:
   means for opening and closing the garage door, the opening and closing means including a motor driven opener connected to the garage door, the opener having a motor mounted remote from the garage door;
   a control circuit mounted adjacent to the motor and operatively connected to the opener for controlling opening and closing of the garage door;
   a light transmitter mounted with the control circuit adjacent to the motor, the transmitter transmitting a light beam;
   a light receiver mounted with the control circuit adjacent to the motor, the receiver in communication with the control circuit and indicating to the control circuit whether it is receiving the light beam such that, when it is not receiving the light beam, the control circuit will inhibit garage door closing; and
   a pair of optical transmission lines each having a termination at the garage door opening, the transmission lines connecting the transmitter and receiver to the garage door opening, so that the light beam from the transmitter can travel through the transmission lines and across the garage door opening to the light receiver.

2. A detection device as set forth in claim 1, wherein termination of each of said transmission lines is near the bottom of a side of the garage door opening.

3. A detection device as set forth in claim 1, wherein a reflector is located opposite the termination of one of the transmission lines.

4. A detection device as set forth in claim 1, wherein said transmission line comprises fiber optics.

5. A detection device as set forth in claim 1, wherein the transmitter transmits an infrared beam.

6. A detection device as set forth in claim 1, wherein the transmitter transmits a pulsed beam.

7. A detection device as set forth in claim 1, wherein the transmitter transmits a coded beam.

8. A detection device as set forth in claim 1, further comprising an enclosure within which the control circuit is located, the transmitter and receiver being located within the enclosure.

9. A detection device as set forth in claim 1, wherein the transmitter transmits the beam as a beam directed across the door opening.

10. A detection device as set forth in claim 1, wherein the termination of the transmission line includes a lens arrangement for one of collecting and directing the beam.

11. A detection device as set forth in claim 1, wherein the termination of the transmission line is attached to the garage door near the bottom.

12. A detection device as set forth in claim 11, wherein at least one of the terminations is retractable away from the garage door opening.

13. An obstruction detection safety device for a garage door which closes a garage door opening comprising:
    means for opening and closing the garage door, the opening and closing means including a motor driven opener connected to the garage door, the opener having a motor mounted remote from the garage door;
    a control circuit mounted adjacent to the motor and operatively connected to the opener for controlling opening and closing of the garage door;
    a light transmitter mounted with the control circuit adjacent to the motor, the transmitter transmitting a light beam;
    a light receiver mounted with the control circuit adjacent to the motor, the receiver in communication with the control circuit and indicating to the control circuit whether it is receiving the light beam such that, when it is not receiving the light beam, the control circuit will inhibit garage door closing;
    a first optical transmission line having a termination at the garage door opening, the first transmission line connecting the transmitter to the garage door opening; and
    a second optical transmission line having a termination at the garage door opening, the second transmission line connecting the receiver to the garage door opening, such that the light beam from the transmitter can be sent across the door opening and the receiver can receive the light beam across the garage door opening from the transmitter through the transmission lines.

14. A detection device as set forth in claim 13, wherein the termination of said first transmission line is near the bottom of a side of the garage door opening and the termination of said second transmission line is near the bottom of a side of the garage door opening.

15. A detection device as set forth in claim 14, wherein the termination of said second transmission line is near the bottom of one side of the garage door opening an the termination of said first transmission line is near the bottom of the opposite side of the garage door opening.

16. A detection device as set forth in claim 15, wherein the termination of said first transmission line is located to direct the beam at the termination of said second transmission line.

* * * * *

UNITED STATES PATENT AND TRADEMARK OFFICE
CERTIFICATE OF CORRECTION

PATENT NO. : 5,233,185
DATED : August 3, 1993
INVENTOR(S) : Louis G. Whitaker

It is certified that error appears in the above-indentified patent and that said Letters Patent is hereby corrected as shown below:

Column 6, line 50 "an" should be --and--.

Signed and Sealed this

Twenty-ninth Day of March, 1994

Attest:

BRUCE LEHMAN

Attesting Officer     Commissioner of Patents and Trademarks